US008683600B2

(12) United States Patent
Landwehr

(10) Patent No.: US 8,683,600 B2
(45) Date of Patent: Mar. 25, 2014

(54) PRINT POLICY COMMANDS

(75) Inventor: John Landwehr, San Mateo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1191 days.

(21) Appl. No.: 11/546,712

(22) Filed: Oct. 11, 2006

(65) Prior Publication Data

US 2014/0029031 A1 Jan. 30, 2014

(51) Int. Cl.
*G06F 17/30* (2006.01)
*H04L 9/00* (2006.01)
*G06F 7/04* (2006.01)

(52) U.S. Cl.
USPC ................. 726/26; 726/30; 705/51; 705/52

(58) Field of Classification Search
USPC .................................. 726/26, 31; 705/51–52
See application file for complete search history.

(56) References Cited

U.S. PATENT DOCUMENTS

| 5,657,433 A * | 8/1997 | Murase et al. ................. 345/642 |
| 6,149,323 A * | 11/2000 | Shima .............................. 400/76 |
| 6,185,684 B1 * | 2/2001 | Pravetz et al. ................. 713/182 |
| 6,336,124 B1 * | 1/2002 | Alam et al. .................... 715/205 |
| 2002/0042876 A1 * | 4/2002 | Smith ............................ 713/153 |
| 2002/0078178 A1 * | 6/2002 | Senoh ............................ 709/219 |
| 2003/0120601 A1 * | 6/2003 | Ouye et al. ....................... 705/51 |
| 2003/0151760 A1 * | 8/2003 | Berndt et al. ................. 358/1.14 |
| 2003/0182475 A1 * | 9/2003 | Gimenez ............................ 710/8 |
| 2004/0054920 A1 * | 3/2004 | Wilson et al. ................. 713/200 |
| 2004/0193915 A1 * | 9/2004 | Smith et al. ................... 713/200 |
| 2005/0039034 A1 * | 2/2005 | Doyle et al. ................... 713/193 |
| 2005/0066187 A1 * | 3/2005 | Peinado et al. ............... 713/193 |
| 2005/0091526 A1 * | 4/2005 | Alkove et al. ................. 713/200 |
| 2005/0097061 A1 * | 5/2005 | Shapiro et al. .................. 705/67 |
| 2006/0112265 A1 * | 5/2006 | Huynh et al. ................. 713/153 |
| 2006/0277122 A1 * | 12/2006 | Shear et al. ..................... 705/28 |
| 2006/0279780 A1 * | 12/2006 | Anno et al. ................... 358/1.15 |
| 2006/0290963 A1 * | 12/2006 | Sakuraba et al. ............. 358/1.13 |
| 2007/0208665 A1 * | 9/2007 | Ohara ............................. 705/51 |
| 2008/0079985 A1 * | 4/2008 | Ferlitsch ...................... 358/1.15 |

OTHER PUBLICATIONS

Harvey, Greg. Adobe Acrobat 6 PDF for Dummies, Jul. 2003 Wiley Publishing, Inc., pp. 11, 81-106, 240.*
Princeton University. "Creating a Postscript Printer in Windows 2000/XP", Jun. 2006.*

* cited by examiner

*Primary Examiner* — Michael Simitoski
(74) *Attorney, Agent, or Firm* — Schwegman Lundberg & Woessner, P.A.

(57) ABSTRACT

Embodiments of converting or translating electronic data from a first format to a second format with an applied electronic data security policy in mechanisms are described generally herein. Other embodiments may be described and claimed.

13 Claims, 4 Drawing Sheets

170

190

PRINT POLICY COMMANDS

TECHNICAL FIELD

Various embodiments described herein relate generally to electronic document translation or conversion, including apparatus, systems, and methods used in electronic document translation or conversion.

BACKGROUND INFORMATION

A user may employ a virtual print driver or computer program to request format conversion or translation of an electronic document. A user may want to subsequently control distribution, derivations, or the generation of hard copy representations of the translated or converted electronic document.

DETAILED DESCRIPTION

Figure 1:
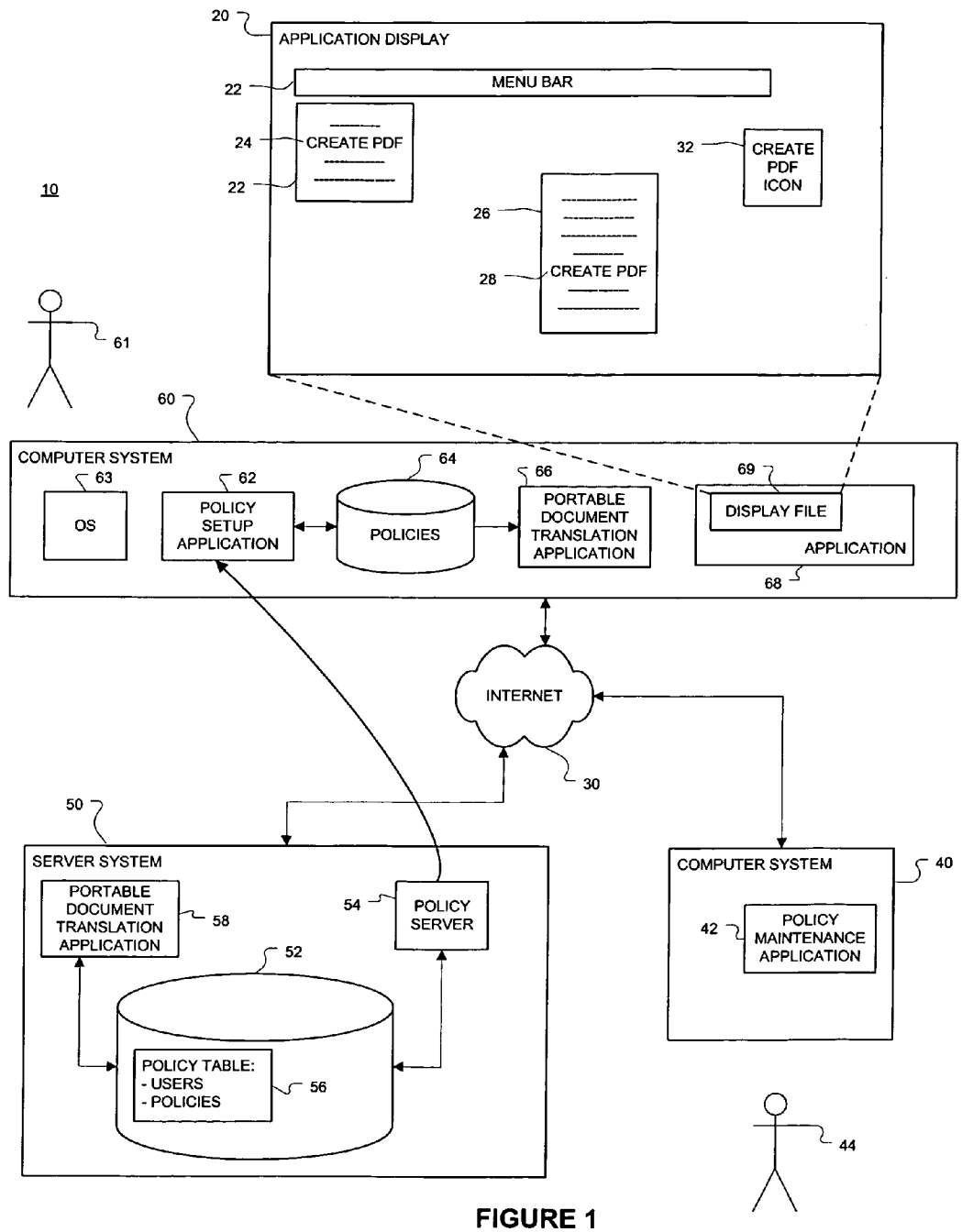
FIG. 1 is a system diagram of an electronic document translation or conversion architecture according to various embodiments.

FIG. 1 is a system diagram of an electronic document translation or conversion architecture 10 including a computer system 60, a server system 50, and a computer system 40 coupled to a network 30 (e.g., the Internet). The computer system 60 may be coupled to the server system 50 via a network 30 (e.g., the Internet). The computer system 40 may be coupled to the server system 50 via the network 30. A viewing user 61 may utilize the computer system 60 to view an application display 20. The computer system 60 may also host an electronic document translation or conversion application 66 where a viewing user 61 may effectively invoke the application 66 or 58 via one or more icons or items 24, 28, 32 to translate or convert an electronic version of the application display 20 or application 68 data.

In an embodiment the icon or item 24 may be part of a menu entry 22 from an application menu 20. The icon or item 28 may be part of a pop up menu 26 that may be invoked by the application 68 or the computer system 60 operating system (OS) application 63, such as Linux®, Windows®, Vista®, or OS X®. The icon or item 32 may be an application 68 add-in that when selected invokes a document translation or conversion and rights management security policy mapping application 66 or 58. In an embodiment an icon or item 24, 28, 32 selection may generate a electronic document translation or conversion and security policy mapping request that is forwarded to predetermined uniform resource locator (URL). The URL may designate the application 66 or 58 and include an indication of the requesting user 61 or computer system 60.

The document translation or conversion and rights management security policy mapping application 66 may operate to convert or translate a document image or data (such as data representing a document) from a first format (e.g., the Microsoft Word format) into a second format (e.g., the XML Paper Specification (XPS) or format the Portable Document Format (PDF)) with rights management security policy mapping. The application 68 may create the display file 69 to enable a viewing user 61 to process at least a segment of data whose image or conversion from a first format to a second format with rights management security policy mapping may be created by the application 66 or 58 upon an icon or item 24, 28, 32 selection. The application 68 may be a word processing, a presentation, a publication, a spreadsheet, or a related document processing application.

Upon selection of an icon or item 24, 28, 32, the document translation or conversion and rights management security policy mapping application 66 (hosted by the computer system 60) or 58 (hosted by server system 50) may be invoked (such as by a URL call). The document translation or conversion and rights management security policy mapping application 66 may translate or convert an image of the display file 69, an image of data being processed by the application, or designated data from a first format into a second format and apply or map a selected rights management security policy. The application 66 may apply a rights management security policy as part of a document conversion process. In an embodiment, the computer system 60 may host a document (e.g., PDF and/or XPS) rights management security policy and profile database 64 and a document (e.g., PDF and/or XPS) rights management security policy and profile setup/maintenance application 62 where each profile may correspond to file conversion settings and mapping of one or more rights management security policies. The document rights management security policy and profile database 64 may be used to store one or more document rights management security policies, such as company confidential, restricted distribution, limited access, license expiration, or profiles corresponding to file conversion settings and mapping of one or more rights management security policies.

In an embodiment the viewing user 61 may be able to maintain rights management security policies or profiles in the policy and profile database 64. The viewing user 44 may be able to maintain rights management security policies or profiles, via a policy maintenance application 42, where the rights management security policies or profiles are locally cached in the policy and profile database 64 by the rights management security policy server application 54 and rights management security policy setup/maintenance application 62 (where rights management security policies for the viewing user 61 or general users may be stored in the rights management security policy table 56). In an embodiment, the viewing user 61 may be required to use a rights management security policy or profile stored in the rights management security policy database 64 or rights management security policy table 56 when the document translation or conversion and rights management security policy mapping application 66 is invoked by icon or item 24, 28, 32 selection (limited to specific policies or profiles including specific policies).

The rights management security policy setup application 62 may receive rights management security policies or updates to rights management security policies or profiles from the server system 50 via the network 30, where specific rights management security policies may be locally cached by the rights management security policy and profile database 64. The server system 50 may host the rights management security policy server application 54 and the rights management security policy and profile database 52. The rights management security policy database 52 may include the rights management security policy table 56 where the table 56 may include general document processing rights management security policies or specific document processing rights management security policies for one or more users such as the viewing user 61. The computer system 40 may host the rights management security policy and profile maintenance application 42. The viewing user 44 may utilize the rights management security policy and profile maintenance application 42 to generate or maintain rights management security policies or profiles in the rights management security policy and profile database 52 via the network 30.

The viewing user 44 may also utilize the rights management security policy or profile maintenance application 42 to generate one or more document translation or conversion profiles where each profile may be associated with file conversion settings and one or more rights management security policy mappings. The document translation or conversion and rights management security policy mapping application 66 may enable or require a viewing user 61 to select a document translation/security profile corresponding to one or more rights management security policies locally cached in the rights management security policy database 64 or stored in the rights management security policy table 56 upon document (e.g., PDF and/or XPS) icon or item 24, 28, 32 selection. In an embodiment the viewing user 61 may be presented with a translation/security profile selection display 80 shown in FIG. 2 upon selection of an icon or item 24, 28, 32.

The portable document translation or conversion application 66 or 58 may create a translation/security profile selection file 72 to be shown on the translation/security profile selection display 80. In an embodiment the computer system 60 OS 63 or application 68 document generation plug-in may generate the translation/security profile selection display 80. The document translation or conversion and rights management security policy mapping application 66 or 58 may retrieve translation/security profiles where each profile may be associated with file conversion settings and one or more rights management security policy mappings stored in the rights management security policy database 64 or the rights management security policy table 56 upon icon or item 24, 28, 32 selection by a viewing user 61. The translation/security profiles presented to a viewing user 61 via the available profile window 84 may be limited as a function of the viewing user 61, the computer system 60, or the application 68. The document translation or conversion and rights management security policy mapping application 66 or 58 may, upon invocation determine the identity of the viewing user 61, the application 68 or computer system 60 that invoked it, and the connection status (e.g., online, offline, secure, in-secure) of the computer system 60.

Figure 2:
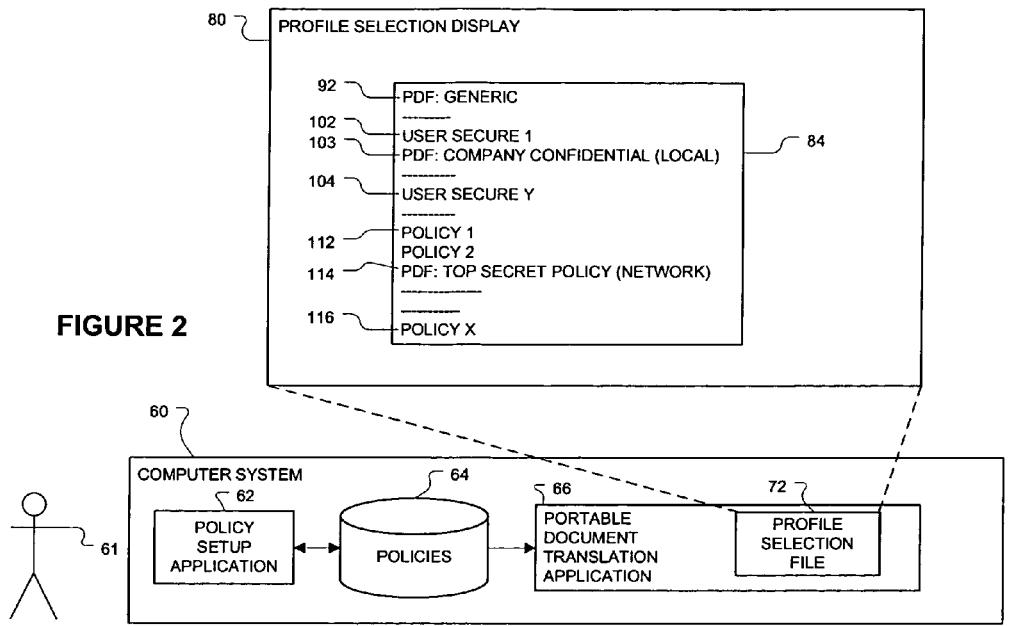
FIG. 2 illustrates a computer system in which an electronic document translation or conversion application resides according to various embodiments.

As noted the electronic document (e.g., a PDF or XPS) translation or conversion and rights management security policy mapping application 58 may be hosted by the server system 50. Upon icon or item 24, 28, 32 selection the document translation or conversion and rights management security policy mapping application 58 may be invoked where the document translation or conversion and rights management security policy mapping application 58 may receive data (such as a print stream via the network 30) from the application 68 including data representing the application display 20, a document whose image is to be recorded in an electronic image document (e.g., a PDF document), or data to be converted from a first format to a second format. The document translation or conversion and rights management security policy mapping application 58 may also determine the rights management security policies available for the viewing user 61 based on the user 61, the requesting computer system 60, or the requesting application 68. As shown in FIG. 2, the available translation/security profile list or window 84 may include a generic PDF profile 92, one or more user specific document translation/security profiles 1 to Y (102 to 104) including PDF: Company Confidential (Local) profile 103, and general translation/security profiles 1 to X (112 to 116) including PDF: Top Secret policy (Network) profile 114.

The viewing user 61 may then select a desired document translation/security profile from the list 84. In an embodiment, each document translation/security profile is related to at least one rights management security policy. The rights management security policies may determine various attributes to the mapped to the translated document including security, ownership, modification and viewing control (ability of a user to read or write the file), or license duration to view or modify the document.

The document translation or conversion and rights management security policy mapping application 66 or 58 may convert an image of the application 68 data including screen or display 20 or translate or convert data provided by the application 68 from a first format to a second format based on selected translation settings while applying the selected rights management security polic(ies).

Figure 3:
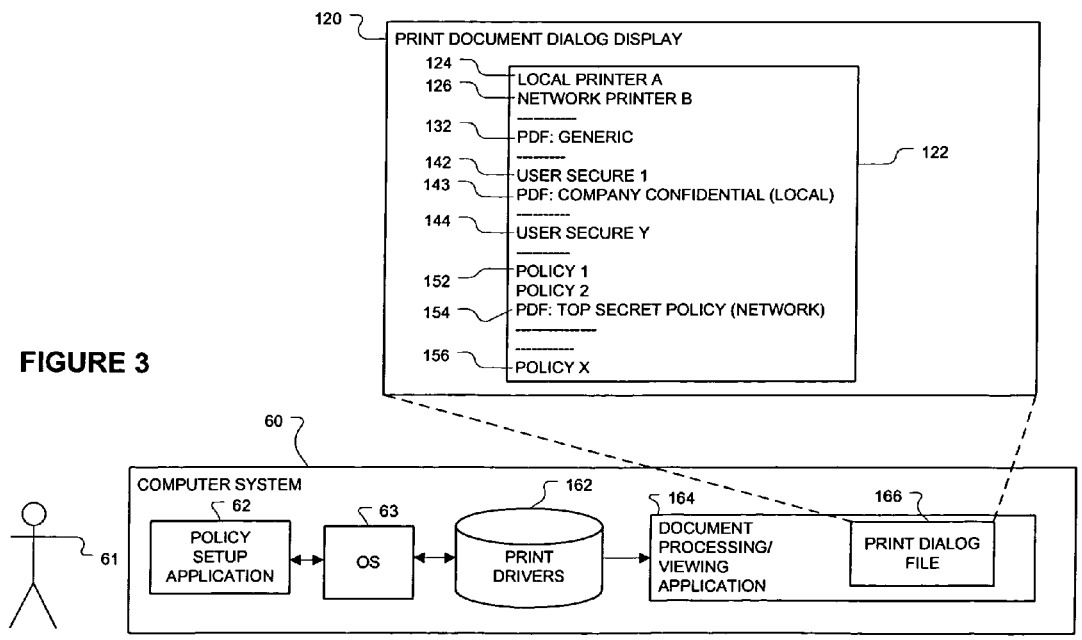
FIG. 3 illustrates a computer system in which a virtual print driver application resides according to various embodiments.

In an embodiment, a viewing user 61 may be able to request translation or conversion of data from a first format to a second format (such as converting an image of application data of a document processing or viewing application 164) and mapping of one or more rights management security policies via an application's 164 print function. As shown in FIG. 3, the computer system 60 OS 63 may be used to maintain electronic document translation/security profiles in the form of one or more print drivers 162 (or other types of profiles). The rights management security policy setup or maintenance application 62 or rights management security policy server 50 via the OS 63 may maintain one or more virtual print drivers where each driver representing an translation/security profile that may be associated with document translation settings and one more rights management security policies.

The rights management security application 62, rights management security policy server 50, or rights management security policy maintenance application 42 via the OS 63 may generate a print driver for each translation/securing profile or rights management security policy available to a viewing user 61, an application 68, or a computer system 60 via the rights management security database 64 or the rights management security policy table 56. The rights management security policy setup application 62, rights management security policy server 50, or rights management security policy maintenance application 42 may create virtual translation/security profile or rights management security policy generation drivers upon document translation or conversion and rights management security policy mapping application 66 installation or periodic, scheduled, or user 44 scheduled operation of the rights management security policy maintenance application 42 or rights management security policy server. In an embodiment upon document translation or conversion and rights management security policy application 66 execution or OS 63 startup, the rights management security policy setup application 62, the rights management security policy server, or rights management security policy maintenance application 42 (via a URL request) may be invoked to update (add or remove) virtual translation/security profile and rights management security policy drivers in the print driver database 162.

The document processing or viewing application 164 may generate a print document dialog display 120 via a print dialog file 166. The print document dialog display 120 may include a print list or window 122. The print list or window 122 may include the available print drivers. As shown in FIG. 3 in an embodiment the document translation/security profiles available to the viewing user 61 via the icon or item 24, 28, 32, e.g., generic PDF profile 92, one or more user specific document translation/security profiles 1 to Y (102 to 104) including PDF: Company Confidential (Local) profile 103, and general translation/security profiles 1 to X (112 to 116) including PDF: Top Secret policy (Network) profile 114 may also be available to a the viewing user 61 as virtual translation/security profile drivers, e.g., generic PDF profile 132, one or more user specific document translation/security profiles 1 to Y (142 to 144) including PDF: Company Confidential (Local) profile 143, and general translation/security profiles 1 to X (152 to 156) including PDF: Top Secret policy (Network) profile 154.

The printer selection list 122 may also include other print selections for printer driver associated with printers such as local printer A 124 and network printer B 126. Upon a viewing user's 61 selection of a virtual translation/security profile driver (142, 144, 152, 154, 156), the application 164 via the OS 63 may forward data representing data to be converted or translated and have one or more rights management security policies applied to the document translation or conversion and rights management security policy mapping application 66 or 58 along with indication of the selected driver, profile, translation settings, or selected rights management security policies (142, 144, 152, 154, 156). In an embodiment the application 164 via the OS 63 may generate a request indicating driver, profile, translation settings, or selected rights management security policies and forward the request to the application 66 or 58 via a URL corresponding to the application 66 or 58. The document translation or conversion application and rights management security policy mapping 66 or 58 may determine the translation settings and rights management security polic(ies) to be applied during the data translation based on the received request. The application 66 or 58 may receive the data to be translated/secured or may generate a request to receive the data via a URL indicating the data to be converted location.

Figure 4:
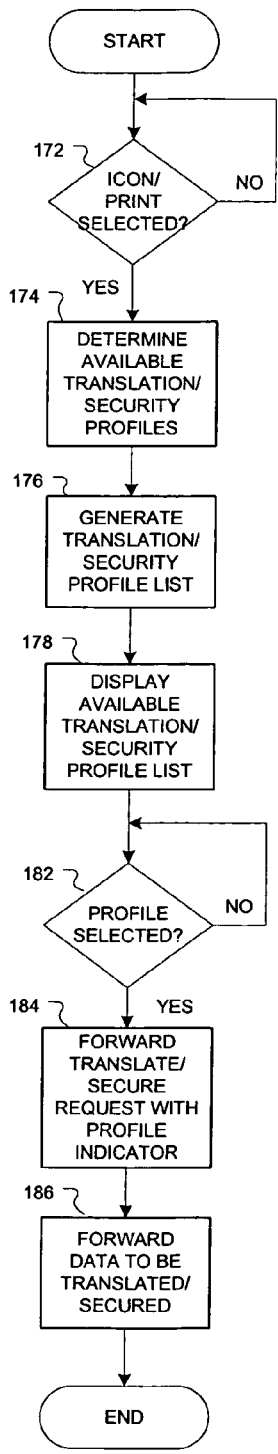
FIG. 4 is a flow diagram illustrating several methods according to various embodiments.

FIG. 4 is a flow diagram of an electronic document translate/secure request method 170 according to various embodiments. In the method 170 when a user (such as viewing user 61) selects a electronic document translate/secure request via the icon or list 24, 28, 32 or print driver (activity 172), the method 170 may determine whether any document translation/security profiles are available as a function of the requesting user 61, the application 68, or the computer system 60 (activity 174). The method 150 may retrieve user, application, or computer system specific or independent translation/security profiles from the rights management security policy database 64 or rights management security policy table 56. The method 170 may create an available translation/security profile list (such as list 84 shown in FIG. 2) based on the retrieved translation/security profiles (activity 176). The method 170 may then display the available translation/security profile list in a format perceptible to the requesting user (such as display 80 in FIG. 2) (activity 178).

Upon user selection of a translation/security profile from the displayed list (activity 182), the method 170 may create an electronic document translate/secure request to be forwarded to an electronic document translation or conversion and rights management security policy mapping application (such as application 66 or 58 in FIG. 1) (activity 184). The request may include an indication of the driver, profile, translation settings, or selected rights management security policies, an indication of the requesting user, application, or computer system, and a uniform resource locator (URL) for the requesting application (such as application 68 in FIG. 1) or data to be translated/secured. In an embodiment the request may be forwarded to a predetermined URL where the URL is related to the electronic document translation or conversion and rights management security policy mapping program (such a URL designating application 66 or 58). The application 66 or 58 URL may vary as a function of the translation/security profile selection. In an embodiment the URL selection may provide an indication of the driver, profile, translation settings, or selected rights management security policies.

The method 170 may then forward data to be translated/secured to an electronic document translation or conversion and rights management security policy mapping application 66 or 58 (activity 186). The data may be forwarded to one or more URLs associated with application 66 or 58 or specified by application 66 or 58 (either in advance or in response to the document translate/secure request). In an embodiment the data to be translated/secured may be forwarded with the translate/secure request. The request may also include an URL related to the location of the data to be translated/secured where the application 66 or 58 may send a request for the data transmission via the URL.

Figure 5:
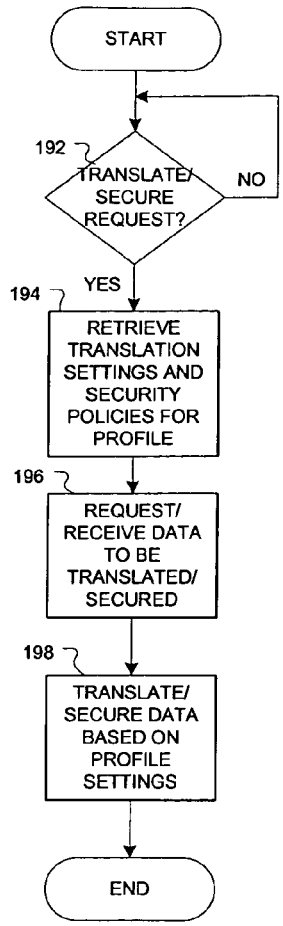
FIG. 5 is a flow diagram illustrating several methods according to various embodiments.

FIG. 5 is a flow diagram of an electronic document translation or conversion and rights management security policy mapping method 190 according to various embodiments. In the method 190 when an electronic data translate/secure request is received (activity 192), the method 190 may retrieve the translation settings and rights management security polic(ies) associated with a translation/security profile designated by the request (activities 192, 194). The method 190 may retrieve the corresponding translation settings and rights management security polic(ies) from the database 64 or table 56. In an embodiment the request may include an indication of translation settings and rights management security polic(ies) to be applied. The electronic data translate/secure request may be received at a specific URL as a function of the translation settings and rights management security polic(ies) to be applied to a document or data. The request may also include the URL address of the data to be translated/secured. The method 190 may then generate a request to the specified URL address to receive the data to be translated/converted/secured (activity 196). In an embodiment the data may be streamed to the electronic document translation or conversion and rights management security policy mapping application 66 or 58 along with the translate/secure request where the stream may be a print stream (generated by a virtual print driver) or other data stream.

The method 190 may then translate and secure the received data based on the translate/secure request (activity 198). The translated/secured data may be stored at a location specified by a requesting user 61, a default location, or a location indicated by one or more applied rights management security policies. In an embodiment the translated/secured data storage location may be indicated by one or more URL addresses. In an embodiment an associated translation/security policy may designate multiple users, applications, computer systems, or URLs to receive the translated/secured data (distribution list).

Figure 6:
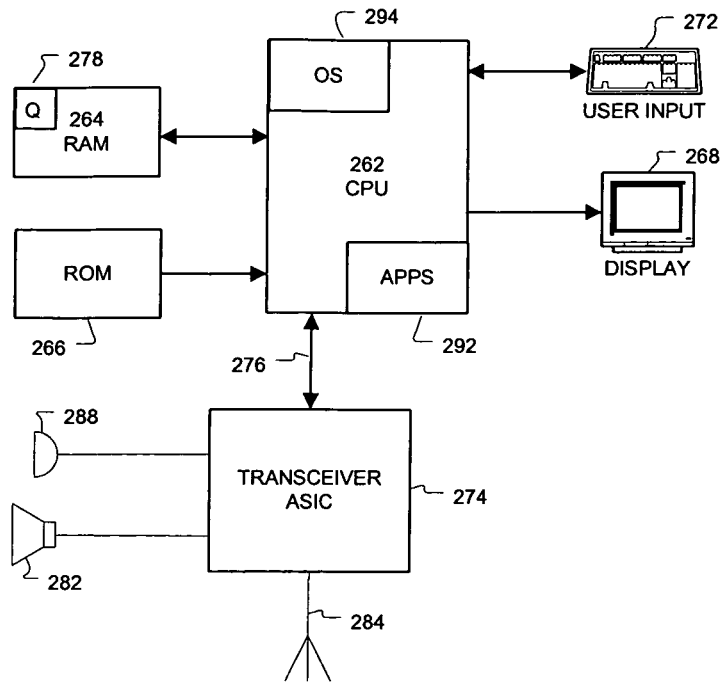
FIG. 6 is a block diagram of an article according to various embodiments.

A device 260 is shown in FIG. 6 that may be used in various embodiments as a computer system 60 or computer system 40 where the device may be any computing device including a personal data assistant, cellular telephone, laptop computer, or desktop computer. The device 260 may include a central processing unit (CPU) 262, a random access memory (RAM) 264, a read only memory (ROM") 266, a display 268, a user input device 272, a transceiver application specific integrated circuit (ASIC) 274, a microphone 288, a speaker 282, and an antenna 284. The CPU 262 may include an OS module 294 and an application module 292. The RAM 264 may include a queue 278 where the queue 278 may store the document translation/security policy database 64. The OS module 294 and the application module 292 may be separate elements. The OS module 294 may execute the computer system 60 OS 63. The application module 292 may execute the application 68, document translation or conversion and rights management security policy mapping application 66, rights management security policy setup application 62, document processing or viewing application 164, and rights management security policy maintenance application 42.

The ROM 266 is coupled to the CPU 262 and may store the program instructions to be executed by the CPU 262, OS module 294, and application module 292. The RAM 264 is coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear documents or displays 20, 80, 120.

The microphone 288 and speaker 282 may be incorporated into the device 260. The microphone 288 and speaker 282 may also be separated from the device 260. Received data may be transmitted to the CPU 262 via a serial bus 276 where the data may include messages or pages received, messages or pages to be transmitted, or protocol information. The transceiver ASIC 274 may include an instruction set necessary to communicate data, screens, or documents in architecture 10. The ASIC 274 may be coupled to the antenna 284 to communicate wireless messages or pages within the architecture 10. When a message is received by the transceiver ASIC 274, its corresponding data may be transferred to the CPU 262 via the serial bus 276. The data can include wireless protocol, overhead information, and data to be processed by the device 260 in accordance with the methods described herein.

Figure 7:
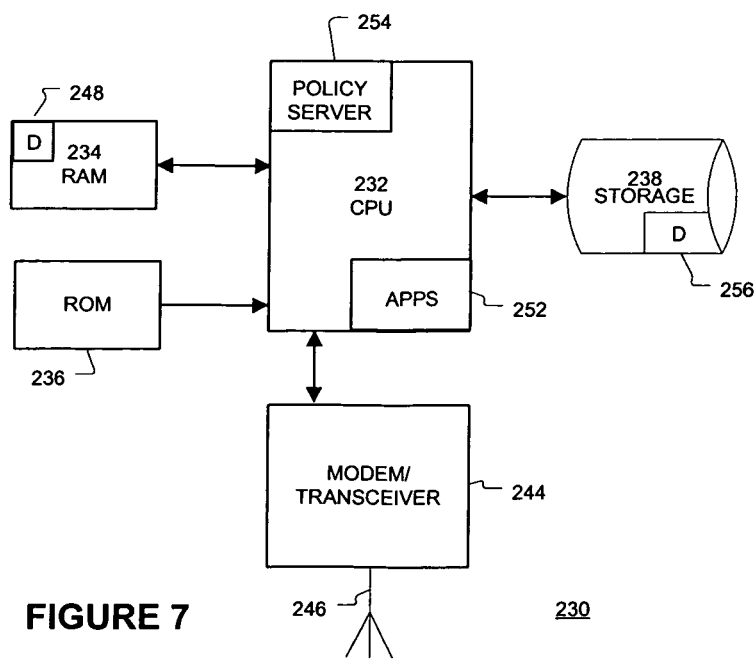
FIG. 7 is a block diagram of an article according to various embodiments.

FIG. 7 illustrates a block diagram of a device 230 that may be employed as a server system 50 in various embodiments. The device 230 may include a CPU 232, a RAM 234, a ROM 236, a storage unit 238, a modem/transceiver 244, and an antenna 246. The CPU 232 may include a document generation policy server module 254 and an application module 252. In an embodiment, the application module 252 may execute the document translation or conversion application 66 or policy setup application 62. The RAM 234 may include a policy database 248 where the database 248 may be used to store the policy table 56. The storage 238 may also include a database 256 where the queue 256 may be used to store the policy database 56. The document generation policy server module 254 and an application module 252 may be separate elements.

The modem/transceiver 244 may couple, in a well-known manner, the device 230 to the network 30 or POTS to enable communication in the network 10. In an embodiment, the modem/transceiver 244 may be a wireless modem or other communication device that may enable communication with the computer system 60 or the computer system 40. The ROM 236 may store program instructions to be executed by the CPU 232, rights management security policy server module 254, or application module 252. The RAM 234 may be used to store temporary program information, queues, databases, and overhead information. The storage device 238 may comprise any convenient form of data storage and may be used to store temporary program information, queues, databases, and overhead information.

Any of the components previously described can be implemented in a number of ways, including embodiments in software. Any of the components previously described can be implemented in a number of ways, including embodiments in software. Thus, the CPU 232, policy server module 254, application module 252, modem/transceiver 244, antenna 246, storage 238, RAM 234, ROM 236, database 248, database 256, CPU 262, OS module 292, application module 294, transceiver ASIC 274, antenna 284, microphone 288, speaker 282, ROM 266, RAM 264, queue 278, user input 272, display 268, computer system 60, computer system 40, and server system 50 may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A system including:
   a first application module, implemented by one or more processors, to enable a first user, from a user interface in a first application, to invoke a conversion profile on electronic data having a first format, the conversion profile being selected from a plurality of conversion profiles, the conversion profile including conversion settings and incorporating a security policy;
   a second application module to invoke the conversion profile, the invoking of the conversion profile including automatically converting or translating the electronic data into electronic data having a second format and being accessible using a second application and automatically securing the electronic data having the second format according to the security policy, the electronic data having the first format not accessible using the second application and the electronic data having the second format not accessible using the first application; and
   a third application module to receive an updated security policy from a security policy server and to modify the selected conversion profile to incorporate the updated security policy, the updated security policy being a modified version of the security policy.

2. The system of claim 1, further including a fourth application module to enable the first user to one of generate and modify the conversion profile.

3. The system of claim 1, further including a fifth application module to enable a second user to one of generate and modify the conversion profile.

4. The system of claim 1, wherein the conversion profile is a virtual printer driver.

5. The system of claim 1, wherein the second format is a portable document file (pdf) format.

6. The system of claim 1, wherein the data provided by the first application module includes a print stream.

7. The system of claim 1, wherein the electronic data having the second format and the security policy are stored separately from the electronic data having the first format and wherein the security policy is accessible by a second user without invoking the first application.

8. The system of claim 1, wherein at least two or more of the first application module, second application module, and third application module are combined into one module.

9. A method, comprising:
   providing, within a first application, executed by one or more processors, a user interface;
   enabling a first user to invoke a conversion profile on electronic data having a first format through the user interface, the conversion profile being selected from a plurality of conversion profiles, the conversion profile including conversion settings and incorporating a security policy,
   receiving an updated security policy from a security policy server, the updated security policy being a modified version of the security policy;
   modifying the selected conversion profile to incorporate the updated security policy; and
   applying the invoked conversion profile to electronic data having a first format accessible using the first application, the applying the invoked conversion profile including:
      automatically converting or translating the electronic data into electronic data having a second format and being accessible using a second application; and
      automatically securing the electronic data having the second format according to the security policy;
   wherein the electronic data having the first format not accessible using the second application and the electronic data having the second format not accessible using the first application.

10. The method of claim 9, further comprising one of generating and modifying, within a third application, one of a plurality of conversion profiles.

11. The method of claim 9, wherein the conversion profile is a virtual printer driver.

12. The method of claim 9, wherein the electronic data represents a page descriptor language file.

13. The method of claim 12, wherein the page descriptor language file is a portable document file.

* * * * *